United States Patent
Silet et al.

(10) Patent No.: US 9,841,038 B2
(45) Date of Patent: Dec. 12, 2017

(54) CONTROLLING METHOD AND SYSTEM FOR COMPRESSED AIR SUPPLY TO A PNEUMATIC NETWORK, IN PARTICULAR IN AN AIRCRAFT

(71) Applicant: MICROTURBO SA, Toulouse (FR)

(72) Inventors: Fabien Silet, Pechbonnieu (FR); Stephane Chevalier, Colomiers (FR); Jean-Francois Rideau, Tournefeuille (FR)

(73) Assignee: MICROTURBO SA, Toulouse (FR)

( * ) Notice: Subject to any disclaimer, the term of this patent is extended or adjusted under 35 U.S.C. 154(b) by 805 days.

(21) Appl. No.: 13/911,346

(22) Filed: Jun. 6, 2013

(65) Prior Publication Data
US 2013/0333365 A1 Dec. 19, 2013

(30) Foreign Application Priority Data
Jun. 11, 2012 (FR) .................................... 12 55420

(51) Int. Cl.
*F01D 17/00* (2006.01)
*F01D 17/06* (2006.01)
(Continued)

(52) U.S. Cl.
CPC .............. *F15B 15/00* (2013.01); *F01D 17/00* (2013.01); *F01D 17/06* (2013.01); *F01D 17/08* (2013.01); *F01D 17/105* (2013.01); *F01D 17/16* (2013.01); *F02C 6/06* (2013.01); *F02C 6/08* (2013.01); *F02C 7/32* (2013.01); *F02C 9/18* (2013.01);
(Continued)

(58) Field of Classification Search
CPC .......... F01D 17/00; F01D 17/06; F01D 17/08; F01D 17/105; F02C 6/08; F02C 7/32; F02C 9/18; F02C 9/28; F04D 27/02; F04D 27/0207; F04D 27/0215; F04D 27/0223; F04D 27/023; F05B 2220/50
See application file for complete search history.

(56) References Cited

U.S. PATENT DOCUMENTS 3,446,425 A 5/1969 Cleeves
3,965,673 A 6/1976 Friedrich
(Continued)

FOREIGN PATENT DOCUMENTS

EP 0 059 061 A2 9/1982
WO 01/23724 A2 4/2001

OTHER PUBLICATIONS

French Preliminary Search Report dated Jan. 30, 2013, in Patent Application No. FR 1255420, filed Jun. 11, 2012 (With English Translation of Category of Cited Documents).

*Primary Examiner* — Gerald L Sung
*Assistant Examiner* — Scott Walthour
(74) *Attorney, Agent, or Firm* — Oblon, McClelland, Maier & Neustadt, L.L.P.

(57) ABSTRACT

A system for supplying compressed air to a pneumatic network includes a load compressor, an air supply and a power shaft driving the load compressor. The system also includes in an air outlet of such load compressor, a connecting channel connected, on the one side, with a channel connected with the pneumatic network and, on the other side, with an air discharge conduct towards an exhaust nozzle. Air flow rate bleed valves are controlled by a processing unit via servo-loops as a function of the pressure sensors and the speed sensor.

8 Claims, 1 Drawing Sheet

(51) Int. Cl.
| | |
|---|---|
| *F01D 17/08* | (2006.01) |
| *F01D 17/10* | (2006.01) |
| *F02C 6/08* | (2006.01) |
| *F02C 7/32* | (2006.01) |
| *F02C 9/18* | (2006.01) |
| *F02C 9/28* | (2006.01) |
| *F04D 27/02* | (2006.01) |
| *F15B 15/00* | (2006.01) |
| *F01D 17/16* | (2006.01) |
| *F02C 6/06* | (2006.01) |
| *F02C 9/26* | (2006.01) |
| *B64D 41/00* | (2006.01) |

(52) U.S. Cl.
CPC ............... *F02C 9/26* (2013.01); *F02C 9/28* (2013.01); *F04D 27/02* (2013.01); *F04D 27/023* (2013.01); *F04D 27/0207* (2013.01); *F04D 27/0215* (2013.01); *F04D 27/0223* (2013.01); *B64D 41/00* (2013.01); *F05B 2220/60* (2013.01); *F05D 2220/50* (2013.01); *F05D 2270/304* (2013.01); *F05D 2270/3015* (2013.01)

(56) References Cited

U.S. PATENT DOCUMENTS

| | | |
|---|---|---|
| 4,380,893 A | 4/1983 | Stokes et al. |
| 4,627,234 A | 12/1986 | Schuh |
| 6,305,156 B1 | 10/2001 | Lui |
| 2010/0152918 A1* | 6/2010 | Riverin .................. F04D 27/02 700/301 |
| 2010/0313573 A1 | 12/2010 | Walters et al. |

* cited by examiner

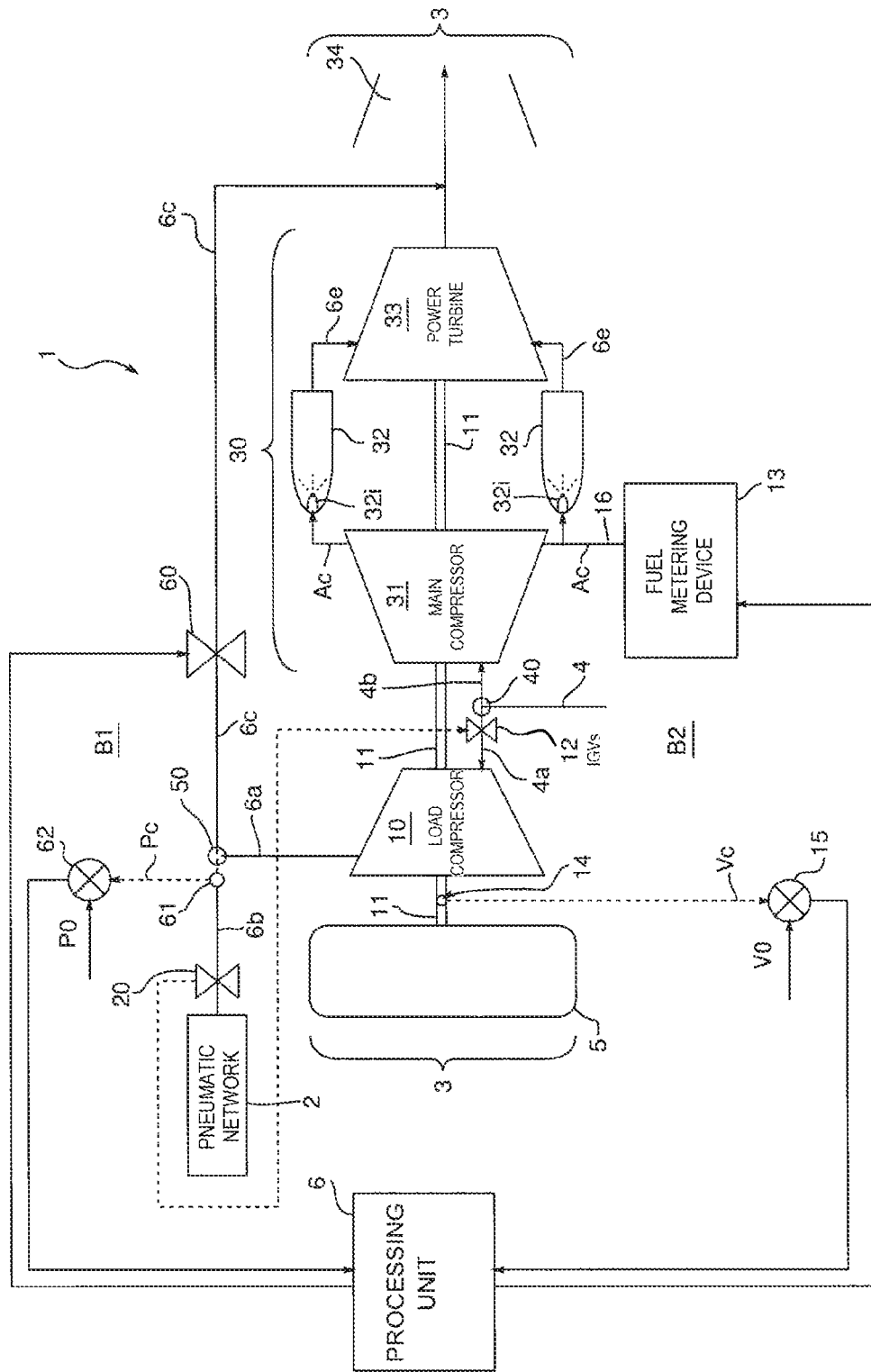

CONTROLLING METHOD AND SYSTEM FOR COMPRESSED AIR SUPPLY TO A PNEUMATIC NETWORK, IN PARTICULAR IN AN AIRCRAFT

TECHNICAL FIELD

The present invention relates to a controlling method for compressed air supply to a pneumatic network, in particular for the network of an aircraft—including, but not exclusively from an auxiliary power unit, in short an APU (Auxiliary Power Unit), equipped in the aircraft—as well as a controlling system for the implementation thereof.

The invention applies to aircraft, i.e. to airplanes (commercial airplanes, regional airplanes or small jet type airplanes) as well as to helicopters. The invention can use a drive through the APU unit equipped in the aircraft, but also a piston engine or an electrical engine.

The aircraft is motorized with main engines—dedicated to propulsion and, in a cruising rating, to generation of a non-propulsive energy from energy consuming equipment (pneumatic, mechanical, hydraulic, electricity, etc.)—and includes an APU unit.

An APU unit is a small turbo-engine or auxiliary engine conventionally including an air inlet, a gas generator and an exhaust nozzle. The gas generator is a compressor-combustion chamber-turbine all together. The turbine is supplied with the combustion gases exiting from the chamber—wherein a compressed air and fuel mixture has been injected—drives the compressor and transmits mechanical power to a gearbox casing. The energy consuming equipment is powered by the gearbox casing via a hydraulic pump, a pneumatic pump or an alternator.

The APU unit thus supplies non-propulsive energy while the aircraft is on the ground and possibly in flight when the main engines are no longer in a capacity to supply non-propulsive energy: for example, in the case where the flight conditions are getting difficult or for delicate phases (search, hostile environment, etc.) in the framework of particular missions, or even in case of a failure of one or more generators integrated into the main engines.

Since a need in terms of a pneumatic power is in general high, a load compressor is generally dedicated to supply this type of power. Such a load compressor is mechanically driven by the gas generator of the APU unit and generates the pneumatic power desired.

STATE OF THE ART

The pneumatic energy being consumed by the aircraft network is variable and must be adapted for the air flow rate variations, while providing a minimum pressure within the network. Moreover, in general, the APU unit only supplies such pneumatic power while the aircraft is on the ground. The power being consumed by the load compressor in flight should be reduced since the pneumatic power is not then consumed.

In order to manage the variations in the compressed air flow rate consumed by the network, the load compressor is provided with internal guiding vanes/valves, the so-called IGV (for "Inlet Guide Vane/Valve"). The opening of such IGVs is controlled at the compressor inlet so as to vary an air flow rate.

With IGVs that do not have a sufficiently high reactivity degree, an anti-surge valve is generally provided so as to be able to overcome the sudden variations of the air flow rates being tapped and to avoid the air back flows. Such an anti-surge valve is extremely reactive, namely about 100 to 200 milliseconds. Furthermore, in flight, when air generation is not used, the resistive torque of the load compressor is reduced at most by closing the IGVs and the anti-surge valve is opened to a maximum.

However, such a management solution for air flow rate variations needs an oversizing of the load compressor. Indeed, IGV closing generates heavy load losses. Consequently, in order to hold a sufficient pressure—in particular when there are weak air tappings—the compressor is oversized so as to be able to gain in compression rate with respect to an air generation capacity thereof in a nominal condition. Due to such oversizing, the engine is not optimized in mass and that then represents a major handicap on flying machines.

DISCLOSURE OF THE INVENTION

The invention aims at overcoming such major disadvantages by basing the management of the tapped air flow rate variations not through an IGV positioning, but through a controlled ejection of an air surplus being not consumed by the network.

More precisely, the present invention aims at providing a controlling method for compressed air supply to a pneumatic network, wherein, the supply being provided by a load compressor, the compressed air is controlled as a function of the instantaneous needs of the pneumatic network by discharging the whole compressed air being not consumed by such network towards the gas exhaust system via a variable opening depending on the air pressure supplied to the pneumatic network. Thus, the load compressor is operated, at a given flight point, at the same operating point, whatever the air flow rate requested by the pneumatic network.

The method allows the load compressor not to be oversized, said compressor staying sized based on compression rate in comparison to its maximum flow rate capacity in a nominal rating. Significant gains in terms of power consumed by the load compressor are thus generated. Moreover, the compressor being of a smaller size, the mass thereof is also reduced. It is the same with retaining systems of the compressor (impeller, lid fastener, etc.). Advantageously, an energy to be restrained in a case of an impeller being damaged is reduced.

According to particular embodiments:
- an opening command for the compressed air towards the gas exhaust system is controlled with a given set point pressure;
- an air generation command of the load compressor according to one of two opening/closing positions is controlled to the opening/closing position of the network inlet; in particular IGVs for air access to the load compressor are regulated according to two positions as a function of the opening/closing position of the air generation command of the load compressor; thus, the IGVs have no need to be regulated over the whole variation range and the IGV controlling is then advantageously simplified.

The invention also relates to a controlling system for compressed air supply to a pneumatic network being able to implement the above-mentioned method. Such a system includes a load compressor, an air supply and a power shaft being able to drive into rotation the load compressor. It also comprises, in a compressed air outlet of such load compressor, a connecting channel connected on the one side with a channel being connected with the pneumatic network and, on the other side, with an air discharge conduit towards a gas discharging nozzle as well as air flow rate bleed valves controlled by a data processing unit as a function of measurements made by a pressure sensor arranged on the connection with the pneumatic network, the valves being arranged on the air supply, on the connection with the pneumatic network and on the discharge conduit.

According to preferred embodiments:

the bleed valve arranged on the discharge conduit is selected amongst a proportional controlling valve in a predetermined range around a set point pressure, an anti-surge valve and a safety valve calibrated at the set point pressure;

the bleed valves arranged on the supply and on the connection to the pneumatic network are valves being settable at two positions of extreme opening/closing conditions;

the valves arranged on the air supply of the load compressor are IGVs;

the rotation driving shaft of the compressor is a mechanical power shaft of one of an APU unit gas generator, a terrestrial motive unit, for example a machine tool, a piston engine or an electrical engine; and the speed of the mechanical power shaft of the APU unit is controlled by a measuring device for the fuel flow rate being injected into a combustion chamber of the APU unit, the flow rate being adjusted so that the speed of said shaft measured by a speed sensor corresponds to a permanent set point value.

BRIEF DESCRIPTION OF THE UNIQUE FIGURE

Other aspects, characteristics and advantages of the invention will appear in the following non-limiting description related to a particular exemplary embodiment, referring to the accompanying unique FIGURE.

This FIGURE represents a non-limiting illustrative example of a base architecture for a compressed air supply system to an aircraft pneumatic network and being controlled according to the invention from a load compressor being driven by a power shaft of an APU unit.

DETAILED DESCRIPTION OF ONE EMBODIMENT

Referring to the unique FIGURE, the exemplary base architecture for a compressed air supply system 1 to a pneumatic network of an aircraft comprises a load compressor 10 being driven by the power shaft 11 of an APU unit 3 of an aircraft. An APU unit is applied, when the aircraft is on the ground or sometimes in flight, for a non-propulsive energy supply. In particular on a descent phase, extra pneumatic energy can be necessary so as to provide an efficient de-icing of the airplane or to release the main engines from non-propulsive functions.

The APU unit 3 includes a gas generator 30—coupling a main compressor 31, a combustion chamber 32 and a power turbine 33—and a gas ejection nozzle 34 in post-combustion.

An air supply 4 provides air to the main compressor 31 and the load compressor 10 via IGVs 12. To do so, the supply 4 is respectively divided into two conduits 4a and 4b through a T-shaped connection 40. The compressor 31 supplies the injectors 32i of the combustion chamber 32 with compressed air Ac pre-mixed with the fuel. The combustion of such mix in the chamber 32 supplies the turbine 33 with high energy gas 6e, thereby driving the power shaft 11 into rotation.

The shaft 11 drives in turn the main compressor 31, the load compressor 10 and a gearbox casing 5. The gearbox casing 5 connects the shaft 11 through gear trains with other energy consuming equipment or materials: alternators, hydraulic pumps or auxiliary engines. As far as it is concerned, the load compressor 10 supplies with compressed air the pneumatic network 2 through a connecting channel 6a.

According to the invention, the system 1 comprises air supply controlling equipment or materials in connection with the base architecture. Thus, on the compressed air outlet of the load compressor 10, the channel 6a is divided to be connected on the one side to the pneumatic network 2 through a connecting channel 6b and, on the other side, to an air discharge conduit 6c towards the gas exhausting nozzle 34. The connections between channels and conduit are made via a T-shaped joint 50.

More particularly, the access to the pneumatic network 2 is controlled by a valve 20 being settable at two extreme opening/closing condition positions when the network 2 requires air. The opening condition of the valve 20 also adjusts the air arrival in the conduit 4a through a command transfer of the opening/closing condition of an IGV 12.

The air discharge towards the nozzle 34 is adjusted in turn by a controlling valve 60 of a variable opening as a function of the air surplus to be discharged.

The controlling valve 60 is here a proportional opening valve adjusted based on a differential provided by a servo-loop B1. The servo-loop B1 comprises a pressure sensor 61 arranged on the connection channel 6b with the network and a comparator 62 providing the pressure differential $\Delta P$ between a set point pressure value P0 and the current pressure value Pc measured by the sensor 61. From the differential $\Delta P$, a position command of the controlling valve 60 is made by a transfer function of a data processing unit 6. In the illustrated example, such unit is the digital control unit or FADEC (for Full Authority Digital Electronic Controller) of the APU unit.

Furthermore, the data processing unit 6 also controls the transfer function of the position command of the IGVs for air arrival into the load compressor 10. In particular, the IGVs are controlled in a position so that the complete closing thereof, as soon as no air surplus is required, allows the creation of a penalizing resistive torque.

Moreover, the data processing unit 6 controls the rotation of the mechanical power shaft 11 of the APU unit 3 by controlling a measuring device 13 for fuel 16. Fuel 16 is pre-mixed with compressed air before being injected into the combustion chamber 32 of the APU unit 3 via the injectors 32i. A servo-loop is implemented by a loop B2 comprising a speed sensor 14 arranged on the power shaft 11 and a comparator 15. The comparator 15 provides the differential $\Delta V$ between the current speed Vc, being measured by the speed sensor 14, and a set point speed value V0. From the differential $\Delta V$, the data processing unit 6 provides a measuring command for the measuring device 13 via an appropriate transfer function.

The invention is not limited to the examples described and represented herein.

It is for example possible to use other bleed valves than the controlling valve 60, in particular the anti-surge valve or a safety valve calibrated as a function of the set point pressure of the loop B1.

Furthermore, the power shaft can be driven by another mechanical energy generator than an APU unit, for example, in other fields than aeronautics, a turbine or a terrestrial motive unit for a machine tool, an engine piston or an electrical engine.

Moreover the IGVs can be substituted by an adapted disengagement of the air supply.

The invention claimed is:

1. A method to control a compressed air supply to a pneumatic network, wherein the compressed air supply is provided by a load compressor, and in a compressed air outlet of the load compressor, a connecting channel is connected, on one side, with a channel connected with the pneumatic network and, on another side, with an air discharge conduit connected with a gas exhaust system, the method comprising:

controlling the compressed air supply as a function of instantaneous needs of the pneumatic network by discharging all compressed air not being consumed by the pneumatic network towards the gas exhaust system, via the air discharge conduit, depending on an air pressure supplied to the pneumatic network, operating the load compressor, at a given flight point, at a constant operation point, independent of the instantaneous needs of the pneumatic network, controlling a valve that regulates air access into the load compressor in opening and closing positions according to an open or closed position of a valve at an inlet of the pneumatic network, and wherein controlling the compressed air supply as a function of the instantaneous needs of the pneumatic network further comprises controlling air flow rate bleed valves, using a data processor, as a function of measurements of the air pressure supplied to the pneumatic network made by a pressure sensor arranged on the channel connected with the pneumatic network, one or more of the air flow rate bleed valves being arranged at an inlet to the load compressor and comprising the valve that regulates air access into the load compressor, one or more of the air flow rate bleed valves being arranged on the channel connected with the pneumatic network, and one or more of the air flow rate bleed valves being arranged on the air discharge conduit.

2. The method according to claim 1, wherein controlling the compressed air supply as a function of the instantaneous needs of the pneumatic network further comprises discharging all compressed air not being consumed by the pneumatic network towards the gas exhaust system when the air pressure supplied to the pneumatic network is at a given set point pressure.

3. The method according to claim 1, wherein the one or more air flow rate bleed valves arranged on the air discharge conduit is at least one of a proportional controlling valve positioned based on a predetermined range around a set point pressure, an anti-surge valve, and a safety valve calibrated at the set point pressure.

4. The method according to claim 1, wherein the one or more air flow rate bleed valves arranged at the inlet to the load compressor and the one or more air flow rate bleed valves arranged on the channel connected with the pneumatic network are valves settable at either of two extreme open and closed positions.

5. The method according to claim 1, wherein the one or more air flow rate bleed valves arranged at the inlet to the load compressor is one or more inlet guide vanes or inlet guide valves.

6. The method according to claim 1, wherein a power shaft drives the load compressor in rotation, and the power shaft is a mechanical power shaft of one of an APU unit gas generator, a terrestrial motive unit, a machine tool, a piston engine, or an electrical engine.

7. The method according to claim 6, further comprising controlling a speed of the mechanical power shaft of the APU unit gas generator by a measuring device for a fuel flow rate being injected into a combustion chamber of the APU unit gas generator, the fuel flow rate being adjusted so that the speed of said mechanical power shaft measured by a speed sensor corresponds to a constant set point value.

8. The method according to claim 1, wherein the controlling the valve that regulates air access into the load compressor includes controlling the valve that regulates air access into the load compressor in only two positions, which are the open and closed positions, according to the open or closed position of the valve at the inlet of the pneumatic network.

* * * * *